(12) United States Patent
DiFonzo et al.

(10) Patent No.: US 8,888,940 B2
(45) Date of Patent: Nov. 18, 2014

(54) METHODS FOR FORMING COMPOSITE HOUSING FRAMES

(75) Inventors: John C. DiFonzo, Emerald Hills, CA (US); Kevin Kenney, San Jose, CA (US); Adam T. Garelli, Santa Clara, CA (US); Christiaan A. Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 13/049,093

(22) Filed: Mar. 16, 2011

(65) Prior Publication Data

US 2012/0049702 A1 Mar. 1, 2012

Related U.S. Application Data

(60) Provisional application No. 61/376,673, filed on Aug. 24, 2010.

(51) Int. Cl.
| | |
|---|---|
| *B29C 70/84* | (2006.01) |
| *B29C 53/56* | (2006.01) |
| *B29C 65/00* | (2006.01) |
| *B29C 70/52* | (2006.01) |
| *B29C 70/86* | (2006.01) |
| *B29L 31/34* | (2006.01) |
| *B29K 307/04* | (2006.01) |
| *B29C 70/54* | (2006.01) |
| *B29C 65/48* | (2006.01) |
| *B29L 12/00* | (2006.01) |

(52) U.S. Cl.
CPC ............ *B29C 70/84* (2013.01); *B29C 66/7422* (2013.01); *B29C 70/52* (2013.01); *B29C 66/721* (2013.01); *B29C 70/865* (2013.01); *B29C 66/1222* (2013.01); *B29C 53/562* (2013.01); *B29L 2031/3481* (2013.01); *B29K 2307/04* (2013.01); *B29C 70/545* (2013.01); *B29C 66/1224* (2013.01); *B29C 66/43421* (2013.01); *B29C 65/48* (2013.01); *B29L 2012/00* (2013.01); *B29C 66/52431* (2013.01)
USPC ............ 156/169; 156/180; 156/242; 156/245

(58) Field of Classification Search
CPC .................................................... B29C 70/84
USPC .................. 156/172, 169, 180, 242, 245, 166
See application file for complete search history.

(56) References Cited

U.S. PATENT DOCUMENTS

| 3,740,285 A * | 6/1973 | Goldsworthy ................ 156/173 |
| 5,139,862 A * | 8/1992 | Swift et al. .................. 428/299.1 |
| 2007/0193676 A1* | 8/2007 | Portoles ...................... 156/169 |
| 2008/0094787 A1 | 4/2008 | Kabeya |

(Continued)

FOREIGN PATENT DOCUMENTS

| EP | 2051572 A2 * | 4/2009 |
| JP | 2008-54306 A * | 3/2008 |

(Continued)

*Primary Examiner* — Jeff Aftergut
(74) *Attorney, Agent, or Firm* — Brownstein Hyatt Farber Schreck, LLP

(57) ABSTRACT

Electronic device frames may be formed from fiber composites. Carbon fiber material may be formed into frame members using pultrusion tools. Notches may be machined into the frame members. The machined frame members may be assembled to form a rectangular frame assembly using lap joints. Fiber tape may be wound around the periphery of the frame assembly. Following curing, additional parts such as a metal blank may be bonded to the frame assembly and machined.

20 Claims, 17 Drawing Sheets

(56) References Cited

U.S. PATENT DOCUMENTS

2008/0265457 A1 10/2008 McLeod et al.
2009/0185340 A1 7/2009 Ji et al.
2010/0289390 A1 11/2010 Kenney
2011/0024694 A1 2/2011 Shah et al.

FOREIGN PATENT DOCUMENTS

KR     200200004602 A  *  1/2002
WO     WO-2009/017571 A2 *  2/2009
WO     WO-2010/135069 A1 * 11/2010

* cited by examiner

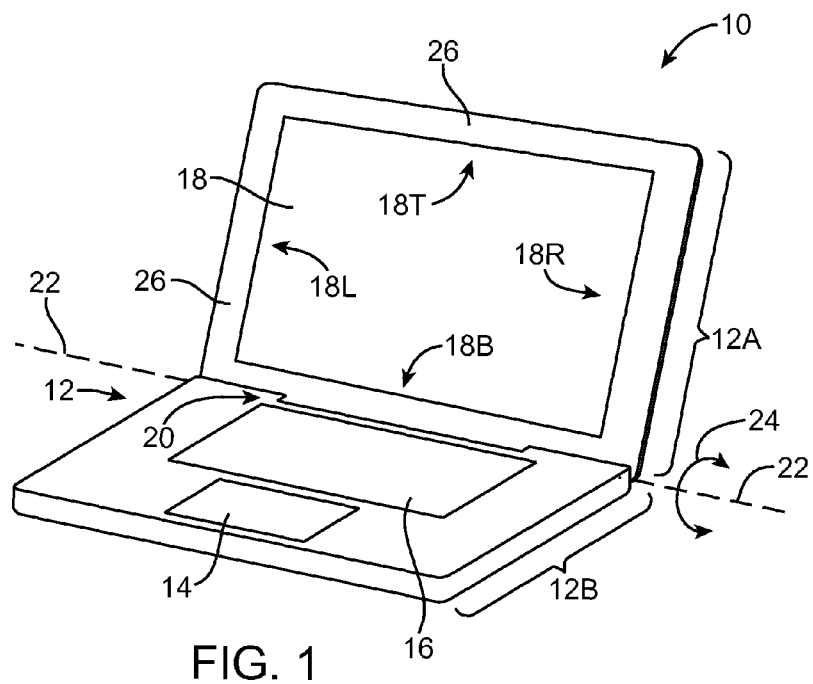
FIG. 1
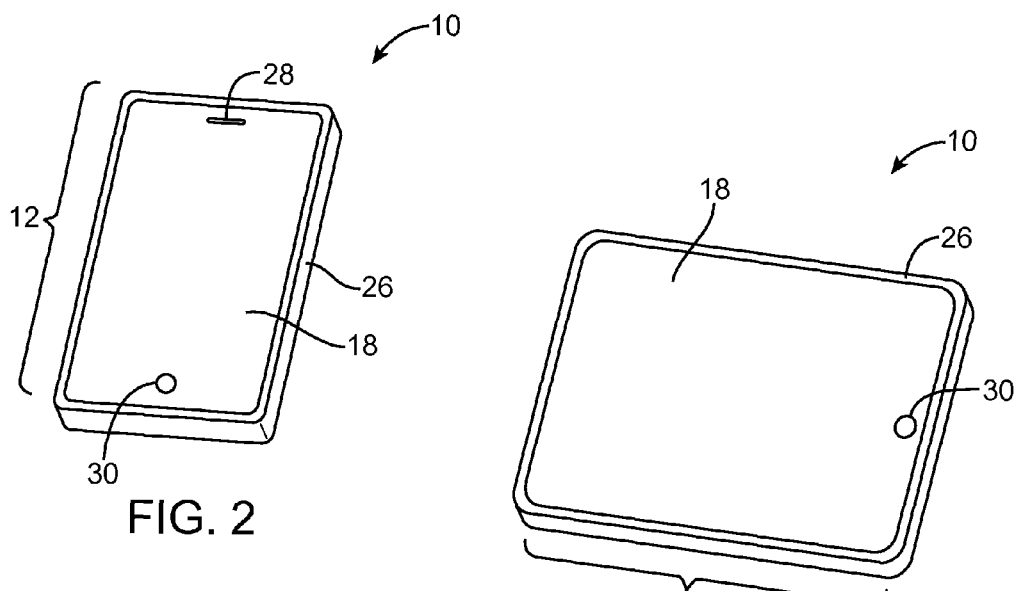
FIG. 2
FIG. 3

METHODS FOR FORMING COMPOSITE HOUSING FRAMES

This application claims the benefit of provisional patent application No. 61/376,673 filed Aug. 24, 2010, which is hereby incorporated by reference herein in its entirety.

BACKGROUND

This relates to electronic devices such as computers, and more particularly, to housing structures for electronic devices.

Electronic devices such as cellular telephones, tablet computers, and laptop computers include housings. Typical housing structures are formed from plastic and metal. Some housing structures use fiber composites.

A typical electronic device housing forms a recess into which device components are mounted. In some devices, housings that contain displays are surrounded by metal bezels and metal bands.

In an effort to reduce weight, it may be desirable to minimize the use of metal housing structures. Unreinforced plastic parts may be lighter than metal, but are vulnerable to damage when a device is dropped or subjected to other unintended impact events.

Sheets of fiber composite material may exhibit satisfactory strength for forming an electronic device housing and may exhibit relatively low weight. Nevertheless, if care is not taken, fiber composite housing structures will not be aesthetically appealing, will be vulnerable to impact damage, and will not interface well with other housing structures in an electronic device.

It would therefore be desirable to be able to provide improved housing structures for electronic devices such as fiber-based housing structures.

SUMMARY

Fiber-based composites may be used in forming frames for electronic devices. The frames may be used in mounting planar device structures such as displays and rear housing plates.

The frames may be formed by winding tape around a mandrel and curing the wound tape. Grooves may be machined in the cured tape to form a frame. A metal blank such as an aluminum blank may be bonded to the frame and machined to form a finished frame.

The frames may also be formed from elongated frame members. A machining tool may be used to machine notches in the ends of the frame members. The notched frame members may be attached to one another at right angles using lap joints to form a four-sided rectangular frame assembly. Fiber tape may be wound around the frame assembly to form a hoop that encircles the frame assembly. A curing process may be used to co-cure the wound fiber tape and the frame members of the frame assembly to form a unitary fiber composite structure. A finished frame may be formed by bonding a metal blank to the unitary fiber composite structure and machining the blank and the composite frame.

Further features of the invention, its nature and various advantages will be more apparent from the accompanying drawings and the following detailed description of the preferred embodiments.

BRIEF DESCRIPTION OF THE DRAWINGS

FIG. 1 is a perspective view of an illustrative electronic device such as a portable computer in accordance with an embodiment of the present invention.

FIG. 2 is a perspective view of an illustrative electronic device such as a cellular telephone or other handheld electronic device in accordance with an embodiment of the present invention.

FIG. 3 is a perspective view of an illustrative electronic device such as a tablet computer in accordance with an embodiment of the present invention.

DETAILED DESCRIPTION

Figure 4:
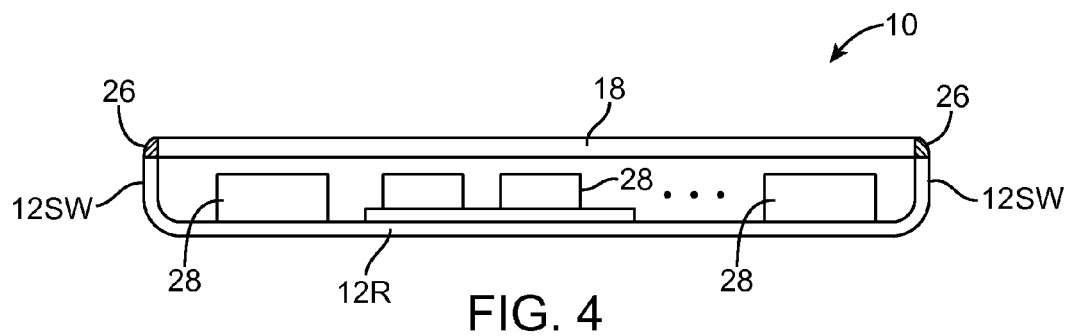
FIG. 4 is a cross-sectional side view of an electronic device having a peripheral housing member such as a bezel-shaped frame that runs around the upper periphery of the device sidewalls while leaving lower sidewall portions exposed in accordance with an embodiment of the present invention.

This relates to structures for electronic devices such as housing structures formed from composite materials. The composite materials may include one or more types of fiber bound together using a binder. Housing structures and other device structures formed from the composite materials may therefore sometimes be referred to as fiber-based composites or fiber composites. Examples of fiber-based composites include carbon fiber composites and fiberglass.

In general, any types of fibers and binders may be used in the composite materials. The fibers may, for example, include metal fibers (e.g., strands of steel or copper), glass fibers, plastic fibers (e.g., polymers such as aramid fibers, nylon, etc.), carbon fibers, nanotubes, etc. These fibers may be relatively thin (e.g., less than 20 microns or less than 5 microns in diameter as with some carbon nanotubes and carbon fibers) or may be thicker (e.g., metal wire). The fibers may be individual fibers or may be twisted bundles of smaller fibers (sometimes referred to as filaments). Regardless of their individual makeup (i.e. whether thick, thin, or twisted or otherwise formed from smaller fibers), the strands of material that are incorporated into the composite materials may be referred to herein as fibers.

Binder can be incorporated into fiber structures to provide these structures with rigidity and other suitable properties. The binder, which is sometimes referred to as a matrix, may be formed from epoxy or other suitable materials. These materials may sometimes be categorized as thermoset materials (e.g., materials such as epoxy that are formed from a resin that cannot be reflowed upon reheating) and thermoplastics (e.g., materials such as acrylonitrile butadiene styrene, polycarbonate, and ABS/PC blends that are reheatable). Both thermoset materials and thermoplastics and combinations of thermoset materials and thermoplastic materials may be used as binders for the composite materials if desired.

The electronic devices in which the composite materials are used may be tablet computers, cellular telephones and other handheld electronic devices, portable computers, other portable electronic devices, computer monitors, computer monitors with embedded computers, televisions, and other electronic equipment. In a typical configuration, the electronic device may be a portable computer, a handheld device such as a cellular telephone, or a tablet computer, so examples of these devices are sometimes described herein. This is, however, merely illustrative. Composite materials may be used in forming housing structures for any suitable electronic devices if desired. Moreover, housing structures formed from composite materials may, if desired, incorporate non-composite materials such as plastic, glass, metal, ceramic, etc. As an example, metal, glass, plastic, and ceramic structures may be attached to composite housing structures using screws and other fasteners, using adhesive such as pressure sensitive adhesive, using clips and other engagement structures, etc.

FIG. 1 is a perspective view of an illustrative electronic device such as a portable computer. As shown in FIG. 1, device 10 may have a housing 12. Housing 12 may include upper housing portion 12A and lower housing portion 12B. Housing portions 12A and 12B may be connected using hinge structures in region 20 (sometimes referred to as a clutch barrel or clutch barrel structures). The hinges in clutch barrel 20 may allow upper housing 12A to rotate relative to lower housing 12B about rotational axis 22 in directions 24.

Lower housing 12B, which may sometimes be referred to as a base or base unit, may include components such as keyboard 16 and pointing device 14. Pointing device 14 may be a track pad and may have associated buttons. Input-output ports may be provided in the housing for main unit 12B. The interior of main unit 12B may include components such as a main logic board, peripheral cards, a battery, communications circuits and busses, wireless transceiver circuitry, etc.

Upper housing 12A, which may sometimes be referred to as a display housing, may include display 18. Upper housing 12A may also include other electrical components. These components may be mounted within clutch barrel 20, behind display 18, or in the peripheral region surrounding the outer periphery of display 18.

Display 18 may have four peripheral edges (e.g., left edge 18L, right edge 18R, top edge 18T, and bottom edge 18B). These edges may be surrounded by one or more housing structures. For example, the edges of display 18 may be surrounded by peripheral housing member 26. Housing member 26 may, for example, have a rectangular ring shape with four elongated sides. Display 18 may have a cover glass plate or other planar display structures that are mounted on the front surface of display housing 12A (i.e., the side of housing 12A that is visible in the example of FIG. 1). A planar sheet material (e.g., a rear plate) may be nested within a groove in the rear side of housing member 26 (i.e., on the side of display housing 12A opposite to that of display 18).

Peripheral housing member 26 or part of member 26 may serve as a cosmetic bezel (e.g., a bezel for display 18) or as a cosmetic trim structure. Peripheral housing member 26 may also serve as a structural support onto which other housing structures may be mounted. Peripheral housing member 26 of device 10 of FIG. 1 (and the other illustrative electronic devices described herein) may therefore sometimes be referred to herein as a frame or support structure.

Some of frame 26 may be external. For example, frame 26 may have surfaces that are exposed along the front and rear faces of display housing 12A and surfaces that are exposed and form sidewalls around the upper, lower, left, and right edges of display housing 12A. In some arrangements, some or all of frame 26 may be mounted internally, within the interior of device 10. Examples in which frame 26 has external surfaces are sometimes described herein as an example. In general, however, frame 26 may be an external frame (i.e., a frame with at least some external surfaces and some internal surfaces) or an internal frame (i.e., a frame that is enclosed within the interior of the housing of device 10). Frame 26 may cover substantially all of the sidewalls of display housing 12A or may be provided in the form of a bezel that surrounds the front of display housing 12A while leaving the rear portions of the display housing sidewalls uncovered.

FIG. 2 is a perspective view of a handheld electronic device. As shown in FIG. 2, electronic device 10 of FIG. 2 may have a display such as display 18 that is mounted on the front of device 12. Device 10 may be, for example, a cellular telephone, media player, or other handheld device. Opening 28 may form a speaker port for a cellular telephone ear speaker and buttons such as button 30 may serve as user input devices for device 10. Display 18 may be a touch screen display. Housing 12 may include a peripheral housing member such as frame 26. Frame 26 may be formed from a band-shaped member that surrounds the four peripheral edges of display 18. Frame 26 may also form a bezel that runs around the top part of the sidewalls of device 10 while leaving the lower sidewalls of device 10 uncovered.

FIG. 3 is a perspective view of an illustrative electronic device such as a tablet computer. As shown in FIG. 3, housing 12 may include a peripheral housing member such as frame 26 that surrounds the four peripheral edges of display 18. Button 30 may be used to supply user input to device 10. Frame 26 may be implemented as a band-shaped member that covers all of the sidewalls of device 10 (i.e., extending from the front face that includes display 18 to the rear face of device 10 on the opposite side from display 18) or may be implemented as a bezel member that runs around the periphery of display 18 near the front face of device 10 while leaving the rear portions of the sidewalls of device 10 uncovered.

FIG. 4 is a cross-sectional side view of an illustrative arrangement for device 10 showing how device 10 may have a bezel-shaped frame 26 that surrounds display 18 near the front face of device 10 while leaving housing sidewalls such as housing sidewalls 12SW substantially uncovered. Internal device components 28 may be mounted on housing rear wall 12R in the interior of device 10.

Figure 5:
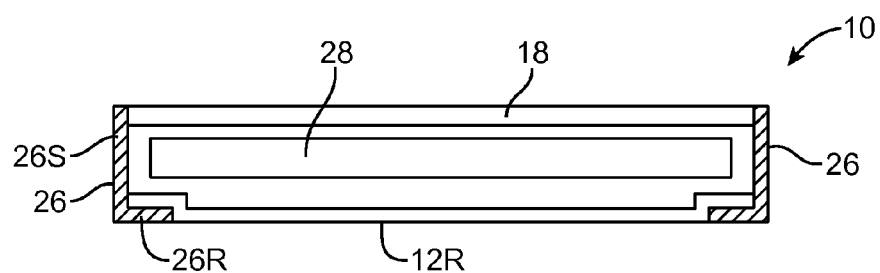
FIG. 5 is a cross-sectional side view of an electronic device having a peripheral housing member such as a rectangular frame with an L-shaped cross section in accordance with an embodiment of the present invention.

In the FIG. 5 example, frame 26 of device 10 has an L-shaped cross section having vertical sidewall portions 26S and rear wall portion 26R. Rear housing wall 12R may be mounted to rear wall portion 26R of frame 26. Interior components 28 may be mounted in the interior of device 10. Display 18 may be mounted on the front face of device 10 and may have four peripheral edges that are surrounded by frame 26.

Figure 6:
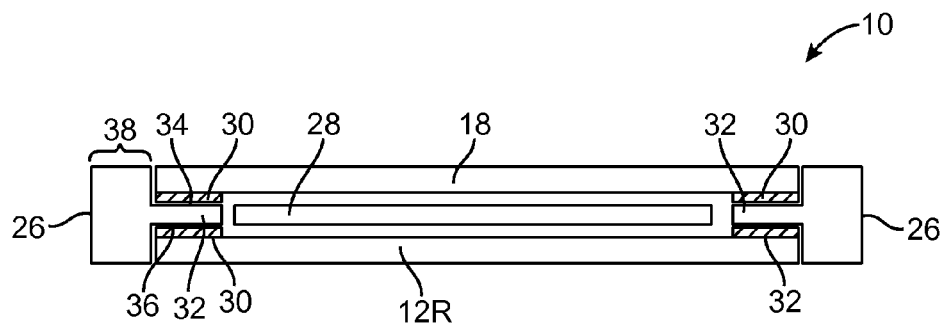
FIG. 6 is a cross-sectional side view of an electronic device having a peripheral housing member such as a rectangular frame with a T-shaped cross section forming vertical sidewalls and a horizontal shelf portion for mounting display structures and a rear housing plate in accordance with an embodiment of the present invention.

As shown in FIG. 6, device 10 may have a frame with a T-shaped cross section. The stem of the T may form shelf portion 32 of frame 26. The top of the T (i.e., vertical frame portion 38) may form vertical sidewalls for frame 26 that surround display 18. Display 18 may be mounted on upper shelf surface 34 of shelf portion 32 using adhesive 30. Rear housing plate 12R may be a rectangular plate of glass, ceramic, metal, plastic, composite, other materials, or layers or other combinations of these materials. Rear housing plate 12R may be mounted to lower shelf surface 36 of frame shelf 32 using adhesive 30.

Figure 7A:
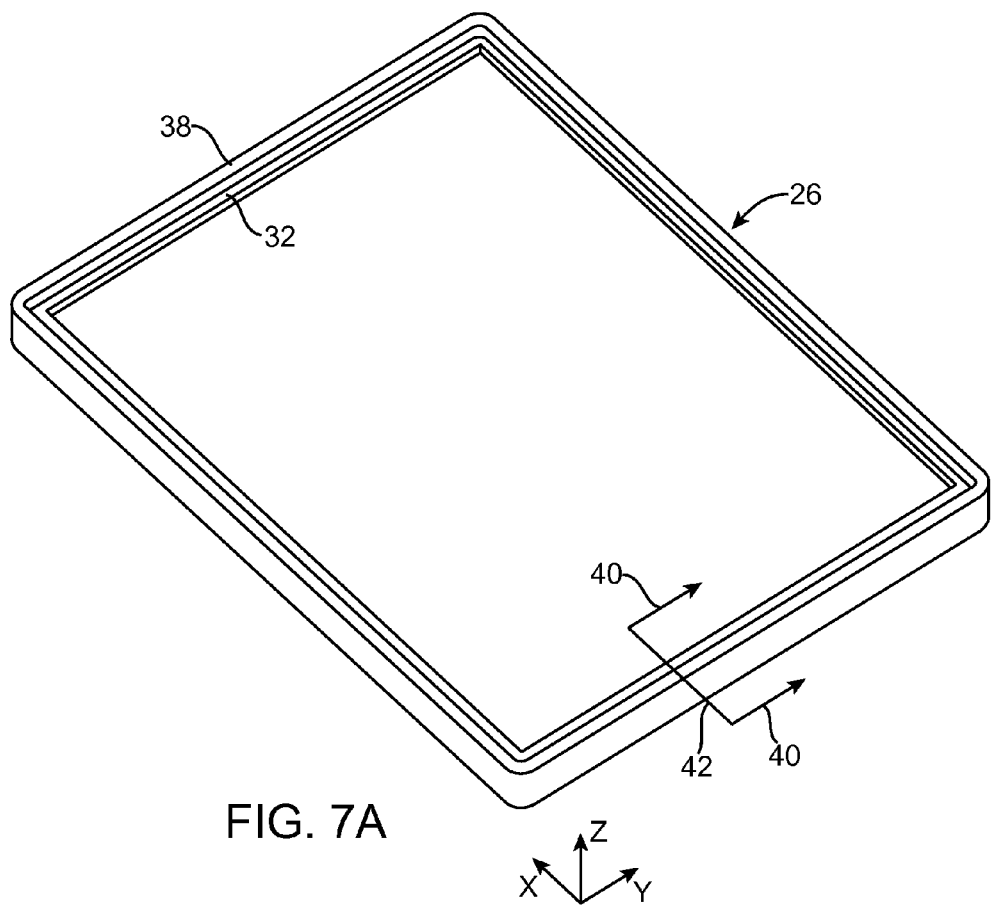
FIG. 7A is a perspective view of an illustrative frame having a T-shaped cross section in accordance with an embodiment of the present invention.
Figure 7B:
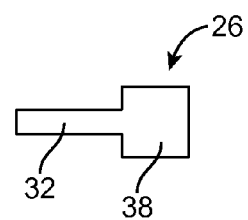
FIG. 7B is a cross-sectional side view of one of the edges of the frame of FIG. 7A in accordance with an embodiment of the present invention.
Figure 26:
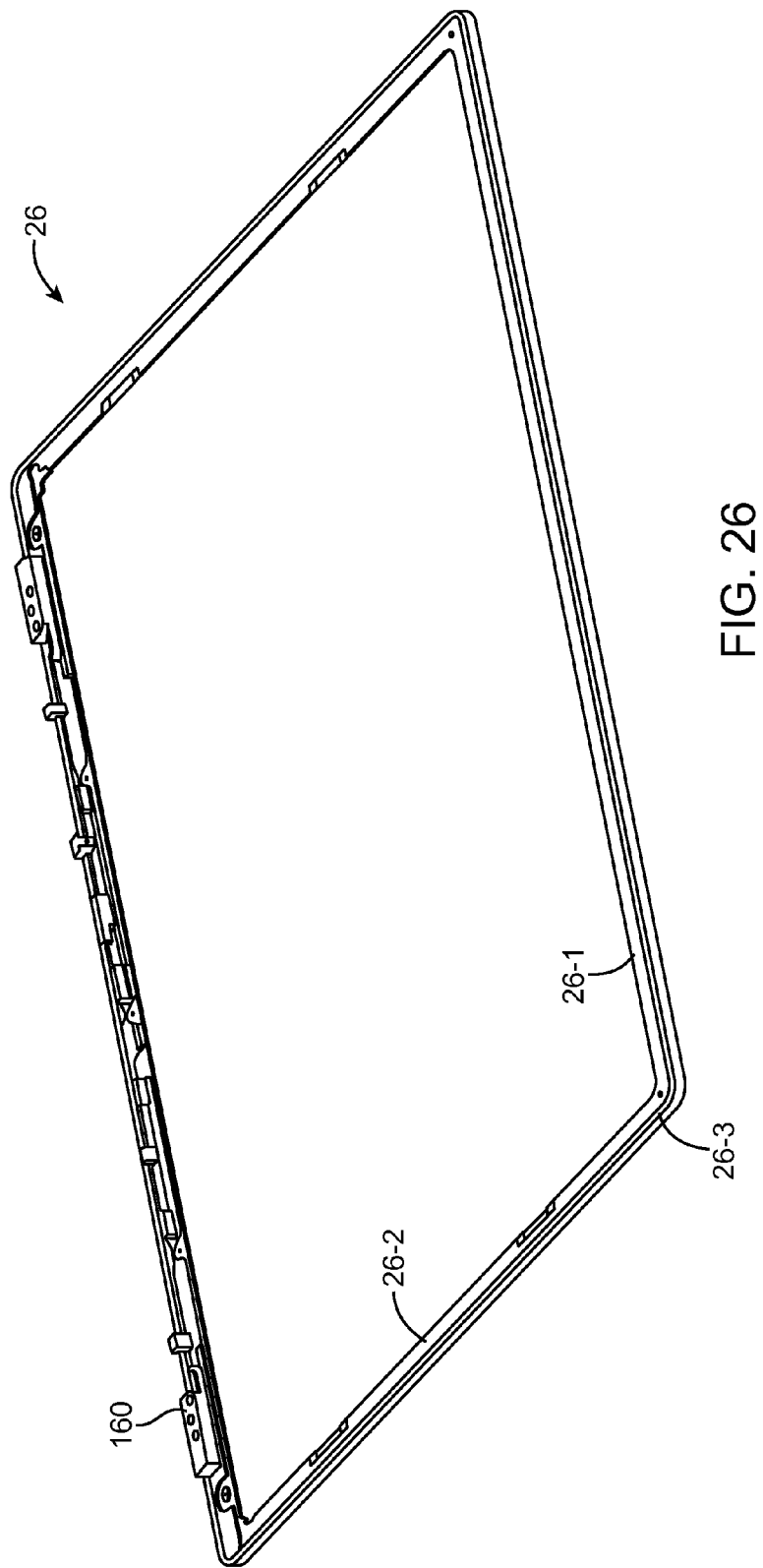
FIG. 26 is a perspective view of a finished frame for an electronic device that has been formed by machining the unfinished frame assembly of FIG. 25 in accordance with an embodiment of the present invention.

FIG. 7A is a perspective view of an illustrative arrangement that may be used for frame 26. As shown in FIG. 26, frame 26 may have the shape of a rectangular ring. Vertical sidewall portions 38 may run around the outside of shelf portion 32. A cross-sectional view of frame 26 taken along line 42 and viewed in direction 40 of FIG. 7A is shown in FIG. 7B.

In general, frame 26 may be formed from metal, glass, ceramic, plastic, composites, other materials, and combinations of these materials. With one suitable arrangement, at least part of frame 26 is formed from fiber-based composites to reduce weight while maintaining satisfactory strength and/ or to increase strength.

Figure 8:
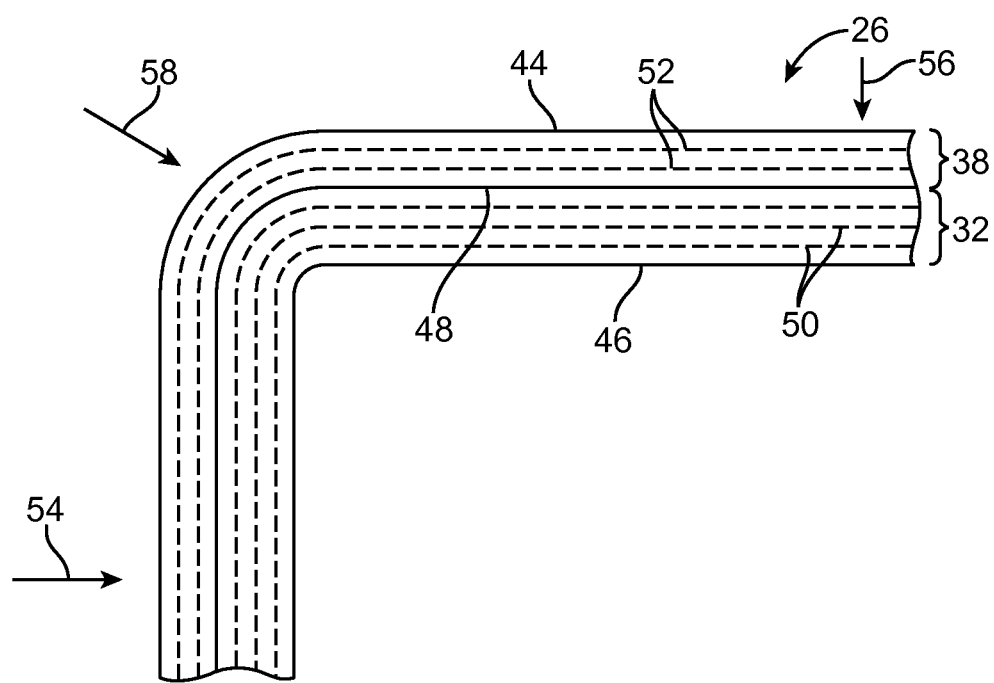
FIG. 8 is a top view of one of the corners of an illustrative rectangular frame with a cross-sectional shape such as a T-shape showing how fibers within the frame may be oriented so as to run parallel to the sides of the frame in accordance with an embodiment of the present invention.

To ensure that frame 26 and device 10 are resistant to damage when dropped or subjected to other impact events, it may be desirable to run the fibers in frame 26 smoothly around frame corners. An example of this type of arrangement is shown in FIG. 8. In the FIG. 8 example, one of the four corners of frame 26 of FIG. 7A is shown in a top view. The solid lines in FIG. 8 correspond to the inner and outer periphery of the frame (lines 46 and 44, respectively) and the division between vertical sidewall portion 38 and shelf 32 (line 48). Dashed lines 50 are aligned with the longitudinal axes of the fibers in shelf portion 32 of frame 26, whereas dashed lines 52 run parallel to the fiber axes of the fibers in vertical sidewall portion 38 of frame 26 (see, e.g., FIG. 7A).

By orienting the fibers of frame 26 so that they run parallel to the outer peripheral wall 44 of vertical frame portion 38 and the inner wall 46 of frame shelf 32, the fibers will be perpendicular to edge impacts in directions such as direction 54 and 56. The fibers will also be perpendicular to a corner impact in direction 58. Fibers oriented perpendicular to the direction of impact in this way will tend to maximize frame strength and thereby help to prevent damage to device 10 in the event of a drop event or other unintended impact. Wrapping the fibers of the frame in a rectangular ring shape so that the fibers run parallel to the edges of the frame may also help to distribute stresses along the fibers, spreading out loads. This tends to reduce the peak load that is experienced during a drop event, helping to protect internal components 28, display 18, and rear plate 12R.

Figure 9:
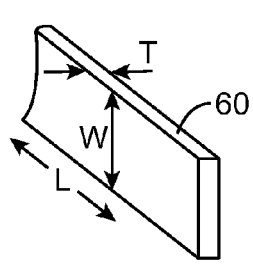
FIG. 9 is a perspective view of a piece of fiber tape such as carbon fiber prepreg tape in accordance with an embodiment of the present invention.

A frame structure with a fiber orientation of the type shown in FIG. 8 may be formed by wrapping fiber tape that has been preimpregnated with binder (sometimes referred to as fiber prepreg or prepreg tape) around a mandrel in a tape winding tool. FIG. 9 is a perspective end view of a piece of illustrative prepreg tape. Prepreg tape 60 of FIG. 9 may have a width W, a thickness T, and a length L. The width W may be, for example, 0.1 to 10 mm or more (or less). The thickness T may be about 0.02 to 3 mm or more (or less). The value of L may be meters or longer prior to cutting (determined by the size of the storage spool from which tape 60 is dispensed).

Figure 10:
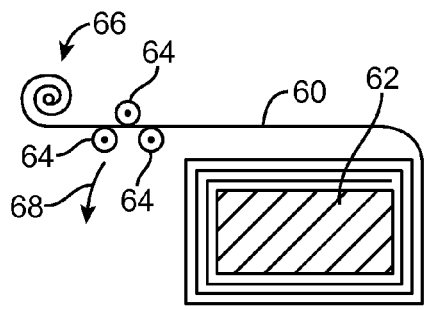
FIG. 10 is a top view of an illustrative winding system showing how fiber tape may be wound around a mandrel to form a frame structure with fibers oriented parallel to the sides of the frame as shown in FIG. 8 in accordance with an embodiment of the present invention.
Figure 11:
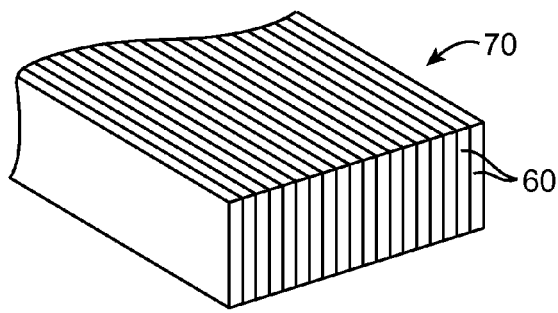
FIG. 11 is a perspective cross-sectional view of a portion of a frame structure formed using a winding apparatus of the type shown in FIG. 10 in accordance with an embodiment of the present invention.

FIG. 10 shows how tape 60 may be wound around mandrel 62 in direction 68 using dispensing rollers 64. Tape 60 may be dispensed from spool 66. Rollers 64 may be moved completely around the periphery of mandrel 62 one or more times (or the mandrel may be moved), until a desired number of tape layers have been formed for frame 26 (see, e.g., the illustrative tape layers 60 of frame portion 70 of FIG. 11).

Figure 12:
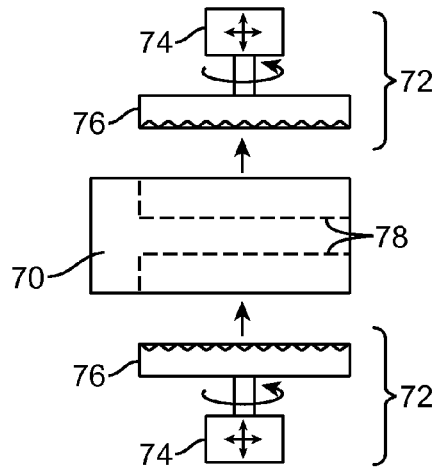
FIG. 12 is a diagram showing how a machining tool may machine grooves in a frame structure of the type shown in FIG. 11 to form a rectangular frame with a T-shaped cross-sectional shape of the type shown in FIGS. 7A and 7B in accordance with an embodiment of the present invention.

Following curing, machining tool 72 may use computer-controlled positioners 74 and rotating cutting heads 76 or other machining equipment to remove undesired portions of frame structure 70, as shown in FIG. 12. In the example of FIG. 12, grooves 78 are being removed. Other features may be machined into frame structure 70 if desired.

Figure 13:
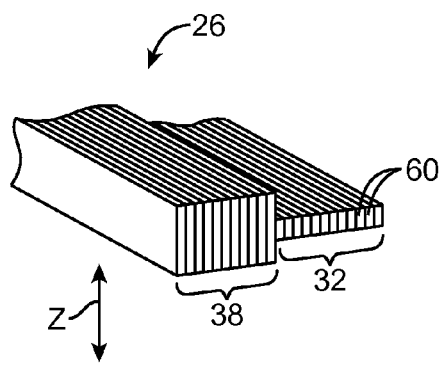
FIG. 13 is a perspective cross-sectional view of a portion of a frame of the type shown in FIGS. 7A and 7B that has been formed using a machining tool of the type shown in FIG. 12 in accordance with an embodiment of the present invention.

Following machining operations with tool 72, frame structure 70 of FIG. 12 is transformed into frame structure 26 of FIG. 13. As shown in FIG. 13, frame 26 may be formed from numerous layers of fiber tape 60. The lateral dimension of tape 60 (i.e., width W of FIG. 9) may be oriented parallel to vertical dimension Z of frame 26 (see, e.g., FIG. 7A). Because the fibers of tape 60 run parallel to its length L, forming frame 26 in this way will ensure that the fibers of frame 26 run parallel to the inner and outer frame edges, even around the corners of frame 26, as described in connection with FIG. 8.

Figure 14:
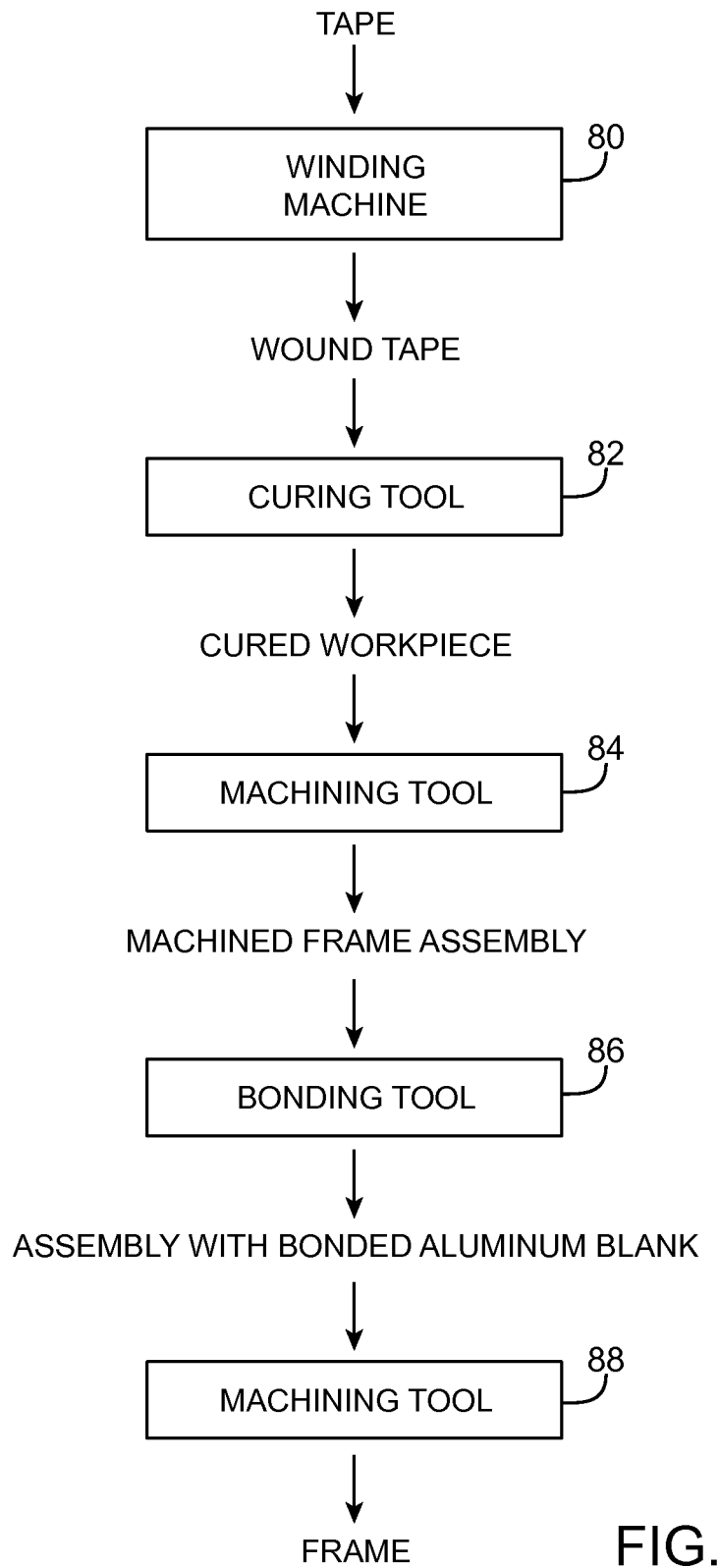
FIG. 14 is a diagram showing illustrative equipment that may be used in forming a frame of the type shown in FIGS. 7A and 7B in accordance with an embodiment of the present invention.

Equipment for forming this type of fiber-based composite electronic device frame is illustrated in FIG. 14.

Initially, fiber tape such as prepreg tape 60 is provided to winding machine 80. Machine 80 winds tape 60 around a form such as mandrel 62 of FIG. 10.

Curing tool 82 may apply heat and/or pressure (e.g., using a mold) until the prepreg has cured (i.e., until the binder has become mixed with the fiber and has set). In systems in which a non-curing thermoplastic material is used, tool 82 may be used to apply heat and/or pressure so as to melt and resolidify the thermoplastic material (rather than to curing prepreg formed of a thermoset material). If desired, winding machine 80 may include heaters (e.g., heating elements that are incorporated into rotating arms, rollers, or other winding mechanisms). In this type of system, the tape that is being wound onto the mandrel may be melted or cured right as it is being applied to the mandrel, using the heaters of the winding tool.

The workpiece that is supplied by tool 82 may be machined (if desired) using machining tool 84 (e.g., a tool such as tool 72 of FIG. 12, a laser cutting tool, or other machining equipment).

It may be desirable to add parts to the machined frame assembly that is supplied by tool 84. Additional parts may be attached using adhesive, screws, mating features, or other suitable fastening techniques. The additional parts that are attached may be pre-machined or may be blank, unfinished materials. Additional parts may be formed from plastic, glass, ceramic, metal, composites, other materials, or combinations of these materials. As one example, bonding tool 86 may be used to adhesively bond a layer of unfinished aluminum (i.e., an elongated rod of aluminum or other metal blank with a rectangular cross section) to one of the edges of frame 26.

This assembly may be machined using machining tool (e.g., a computer-controlled milling machine).

Figure 15:
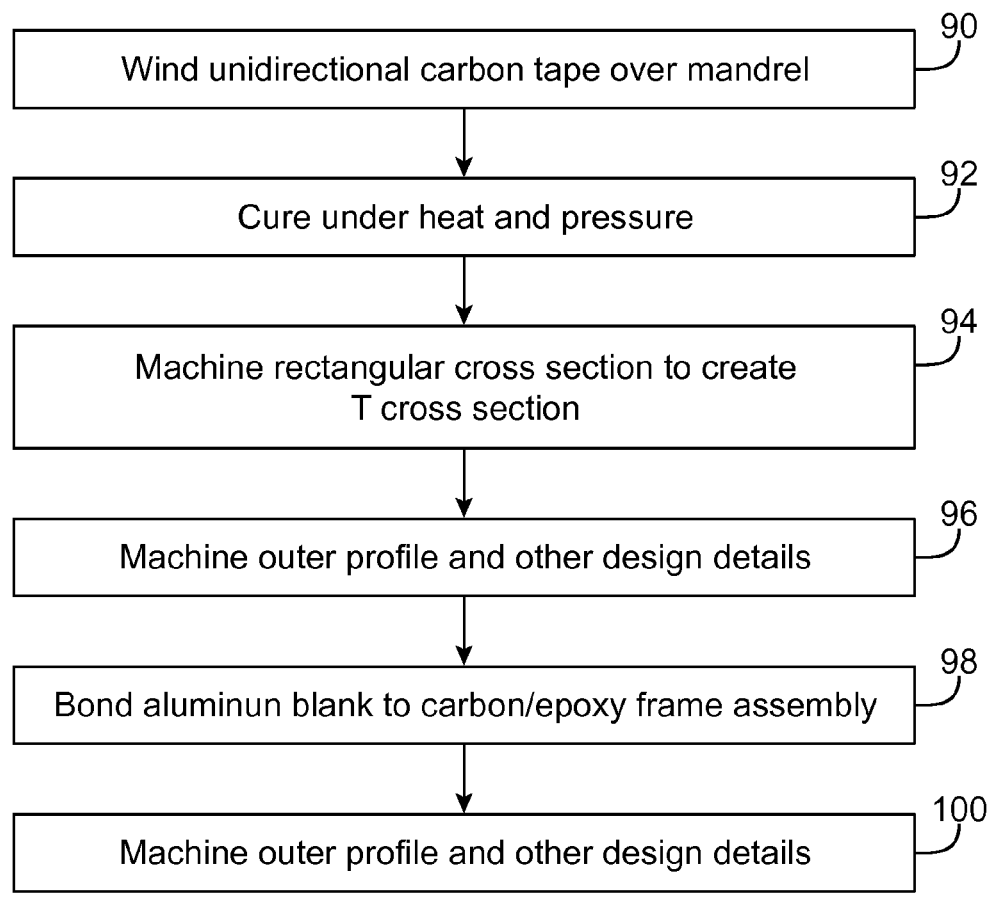
FIG. 15 is a flow chart of illustrative steps involved in forming a frame using equipment of the type shown in FIG. 14 in accordance with an embodiment of the present invention.

Illustrative steps involved in forming frame 26 using equipment of the type shown in FIG. 14 are set forth in the flow chart of FIG. 15.

At step 90, fiber tape 60 such as prepreg tape (e.g., tape with longitudinally oriented carbon fibers in a binder such as epoxy or other carbon tape) may be wound over mandrel 62.

At step 92, a curing tool (e.g., a tool with a heated mold such as tool 82) may cure the wound tape structure by applying heat and pressure.

The resulting structure may be machined at step 94 (e.g., by using tool 84 of FIG. 14 to create grooves and a shelf as shown in frame 26 of FIG. 13).

At step 98, an aluminum blank or other suitable additional parts may be bonded to the machined frame structure (e.g., using adhesive and bonding tool 86 of FIG. 14).

The aluminum blank or other additional structures may be machined and the profile of the fiber portion of frame 26 may be machined during the operations of step 100 (e.g., using machining tool 88 of FIG. 14).

If desired, frame 26 may be formed using fiber-based structures that have joints with perpendicularly oriented fibers. This type of scenario is illustrated in the example of FIGS. 16 and 17.

Figure 16:
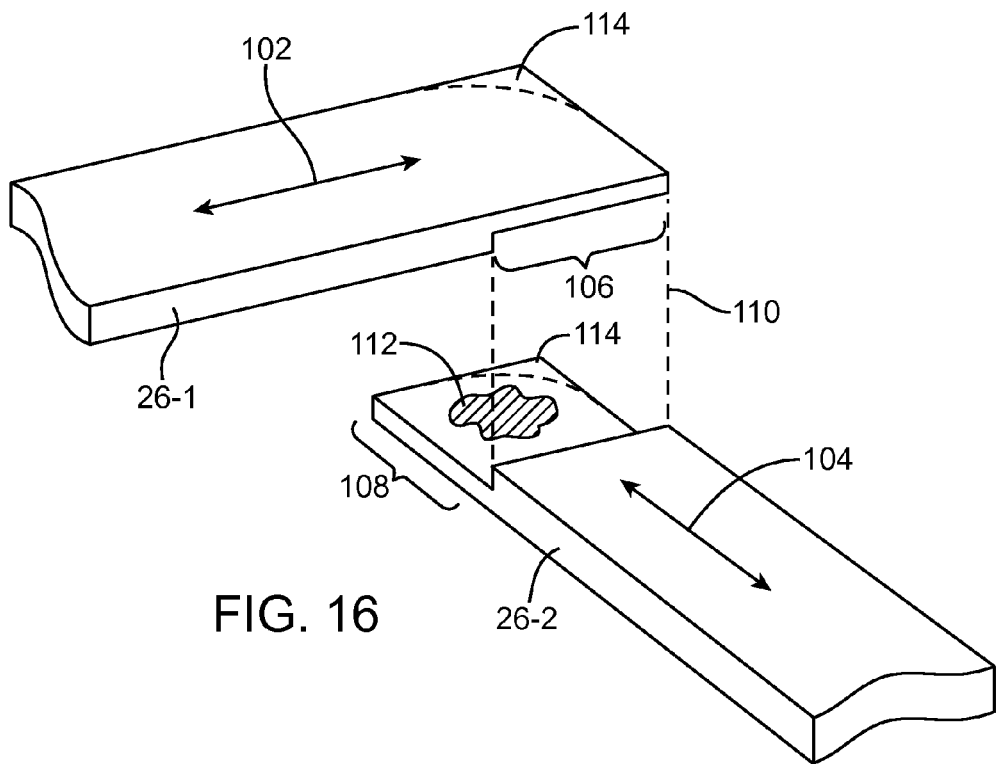
FIG. 16 is an exploded perspective view of two illustrative frame member having notches for forming a lap joint in accordance with an embodiment of the present invention.
Figure 17:
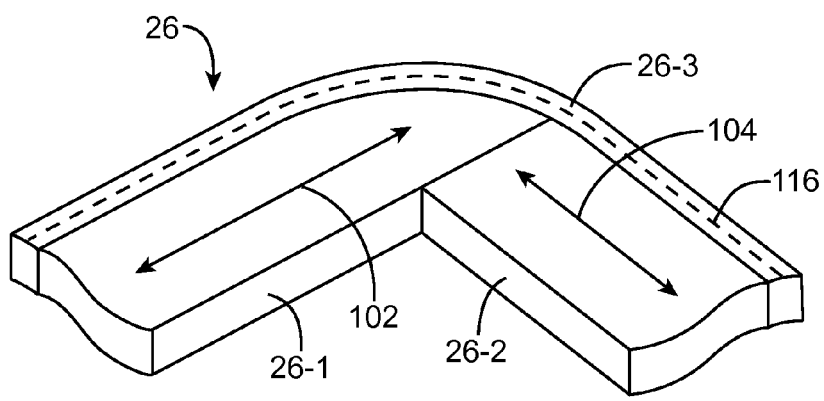
FIG. 17 is a perspective view of a corner portion of an illustrative frame that has been formed from an assembly with frame members that are attached to each other using lap joints around which layers of fiber tape have been wound in accordance with an embodiment of the present invention.

As shown in FIG. 16, frame 26 may be formed (at least partly) from frame members 26-1 and 26-2. Frame member 26-1 may have fibers that run parallel to longitudinal frame member axis 102. Frame member 26-2 may have fibers that run parallel to longitudinal frame member axis 104. A joint such as a lap joint or other suitable joint may be used to attach frame member 26-1 to frame member 26-2 (e.g., using adhesive 112). Frame member 26-1 may have notch 106 and frame member 26-2 may have notch 108 to facilitate forming a lap joint when members 26-1 and 26-2 are joined along dashed lines 110.

After members 26-1 and 26-2 are attached to one another, an outer fiber-based layer may be created to complete frame 26 while providing frame 26 with additional strength. The corner at which frame members 26-1 and 26-2 meet may be eased by machining away portions 114 of FIG. 16 (if desired).

After the assembly formed by members 26-1 and 26-2 has been processed (e.g., by curing and optional machining), carbon tape or other tape 60 may be wound around the machined assembly to form outer frame member 26-3. As illustrated by dashed lines 116 in FIG. 17, the fiber in outer frame portion 26-3 will run parallel to the inner and outer edges of portion 26-3, thereby enhancing the strength of frame 26 as described in connection with FIG. 8.

In the example of FIGS. 16 and 17, frame portions 26-1 and 26-2 have substantially rectangular cross-sectional shapes. If desired, pultrusion techniques, machining techniques, or other techniques may be used to form frame members such as members 26-1 and 26-2 that have a T-shaped cross section (or other desired cross sections).

Figure 18:
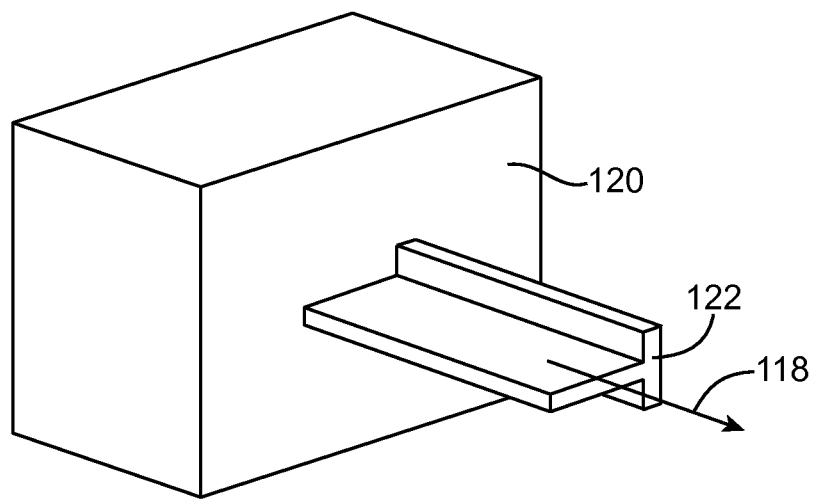
FIG. 18 is a perspective view showing how fiber composite frame members such as frame members with a T-shaped cross-section may be formed using a tool such as pultrusion tool in accordance with an embodiment of the present invention.

FIG. 18 shows how frame material 122 may be pulled and extruded in direction 118 through pultrusion tool 120 (e.g., by pulling fiber through a reservoir of binder while applying heat). Once cut into desired lengths and machined, strips of frame material 122 may serve as frame members 26-1 and 26-2. Other techniques may be used for forming elongated frame members if desired (e.g., using lamination and compression techniques.

Figure 19:
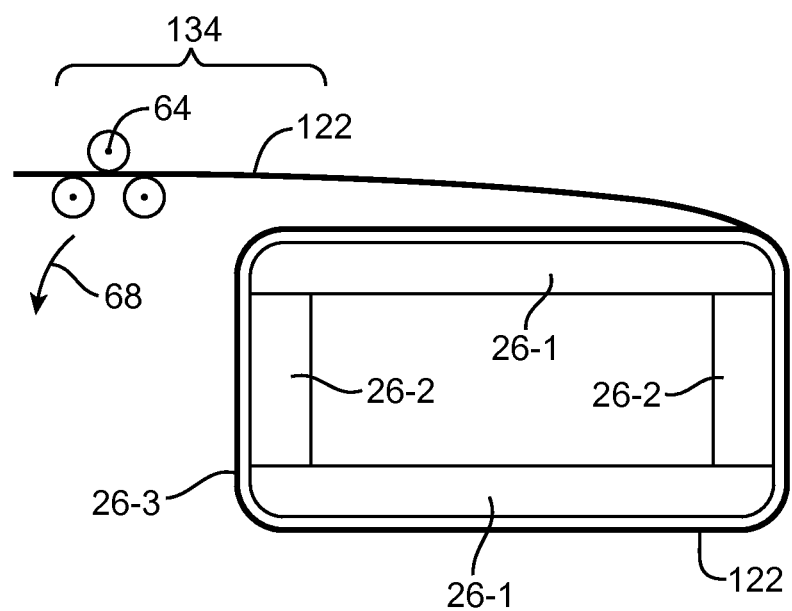
FIG. 19 is a top view showing how a winding tool may be used to wind fiber tape around a frame assembly formed from lap-jointed pultrusion frame members in accordance with an embodiment of the present invention.

FIG. 19 shows how fiber tape 60 of FIG. 9 may be wound by winding tool 134 around a frame assembly formed from fiber-based frame members 26-1 and 26-2 to form a rectangular peripheral frame portion with longitudinally aligned fibers such as frame portion 26-3 of FIG. 17. A curing tool (e.g., a heated mold) may be used to co-cure frame members 26-1, 26-2, and 26-3 to form frame 26. If desired, optional additional parts (e.g., aluminum blanks) may be bonded to the frame and machined and/or additional frame machining may be performed before frame 26 is used as part of device housing 12 in device 10.

Figure 20:
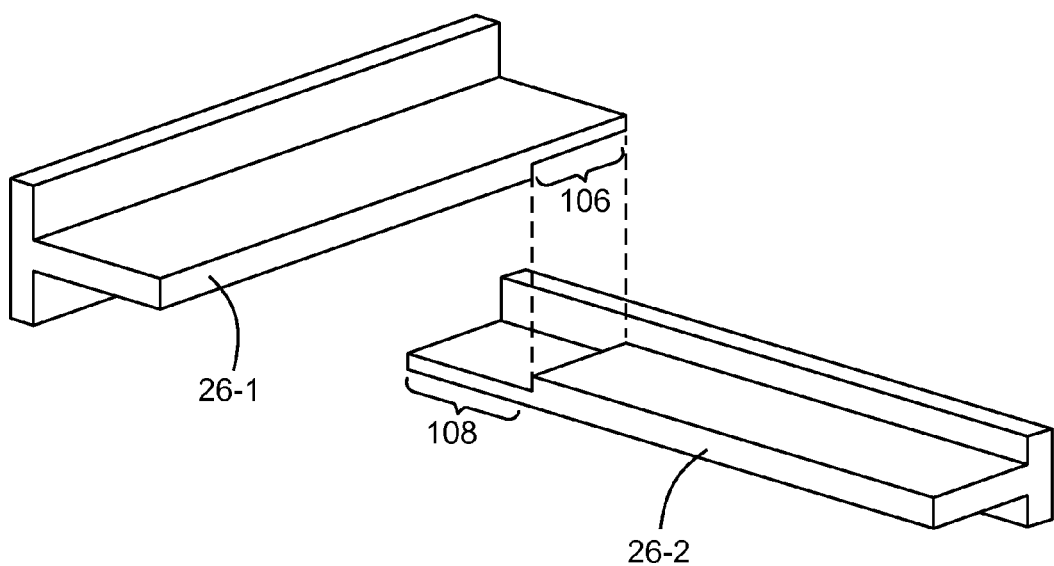
FIG. 20 is an exploded perspective view of two notched frame members having T-shaped cross sections that are being attached to each other using a lap joint in accordance with an embodiment of the present invention.

FIG. 20 illustrates how T-shaped frame members 26-1 and 26-2 or frame members with other suitable cross-sectional shapes may be attached to each other using a lap joint arrangement of the type described in connection with FIG. 16.

Figure 21:
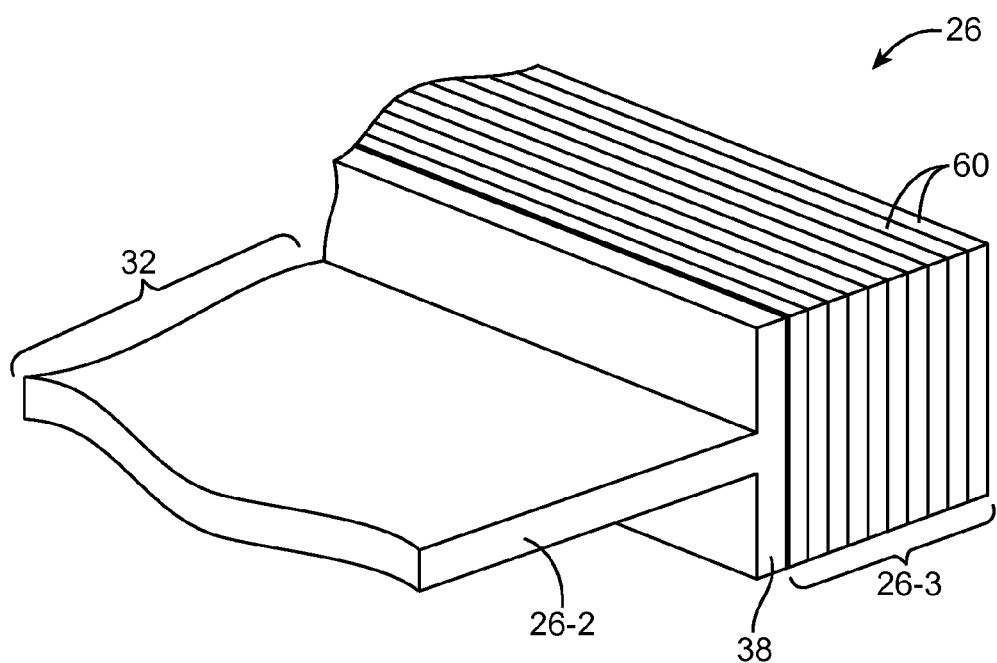
FIG. 21 is a perspective cross-sectional view of a portion of a frame that has been formed from T-shaped pultrusion frame members around which layers of fiber tape have been wound in accordance with an embodiment of the present invention.

FIG. 21 is a perspective cross-sectional view of an edge segment of frame 26 of FIG. 19. As shown in FIG. 21, frame 26 may include portions such as member 26-2 (formed by pultrusion or other suitable techniques) and wound tape layers such as layers 60 in portion 26-3.

Figure 22:
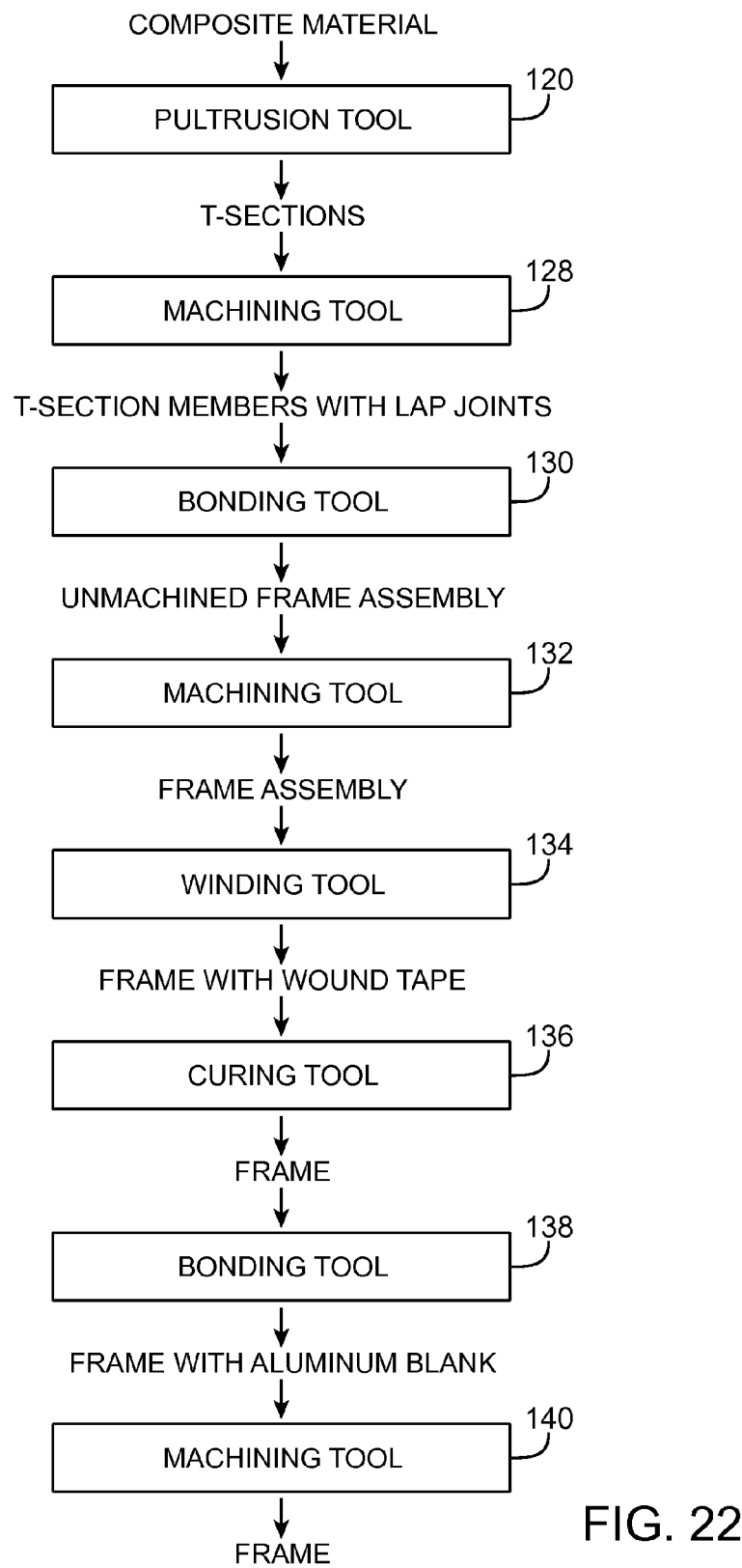
FIG. 22 is a diagram showing illustrative equipment that may be used in forming a frame or other housing structure for an electronic device that includes co-cured pultrusion structures and wound fiber structures in accordance with an embodiment of the present invention.

Equipment that may be used in forming frame 26 of FIG. 21 (e.g., using a combination of pultrusion and winding techniques or other techniques) is shown in FIG. 22.

As shown in FIG. 22, composite material (e.g., carbon fiber and binder) may be formed into strips (e.g., T-sections or elongated structures with other suitable cross-sectional shapes) for members 26-1 and 26-2 using pultrusion tool 120 (or other suitable equipment).

Following optional curing operations, machining operations may be performed by machining tool 128 (e.g., to form notches such as notches 106 and 108 in frame members 26-1 and 26-2 as shown in FIG. 20).

Bonding tool 130 may use adhesive and pressure to attach pultrusion frames member 26-1 and 26-2 together to form a four-sided frame assembly (e.g., using lap joints).

Machining tool 132 may perform optional machining operations to form features in the frame assembly (e.g., screw holes, recesses, eased corners and edges, ledges, etc.).

Winding tool 134 may be used to wind fiber tape 60 around the assembly formed from the four pultrusion frame members.

Tool 136 (e.g., a curing tool or other tool for applying heat and pressure such as a heated mold) may apply heat and pressure to the wound tape and the rest of the frame assembly. When thermoset materials are being processed, the application of heat and pressure may co-cure the tape layers and the frame members (e.g., pultrusion frame members) together to form a unitary cured frame assembly. When thermoplastic materials are being processed, the application of heat and pressure may melt the tape layers and frame members together.

Bonding tool 138 may be used to bond an aluminum blank or other optional additional parts to the frame assembly with adhesive.

Machining tool 140 may be used to machine features into the bonded aluminum blank or other additional material that was bonded to the frame assembly and/or to the frame assembly frame members formed from the fiber-based material.

Figure 23:
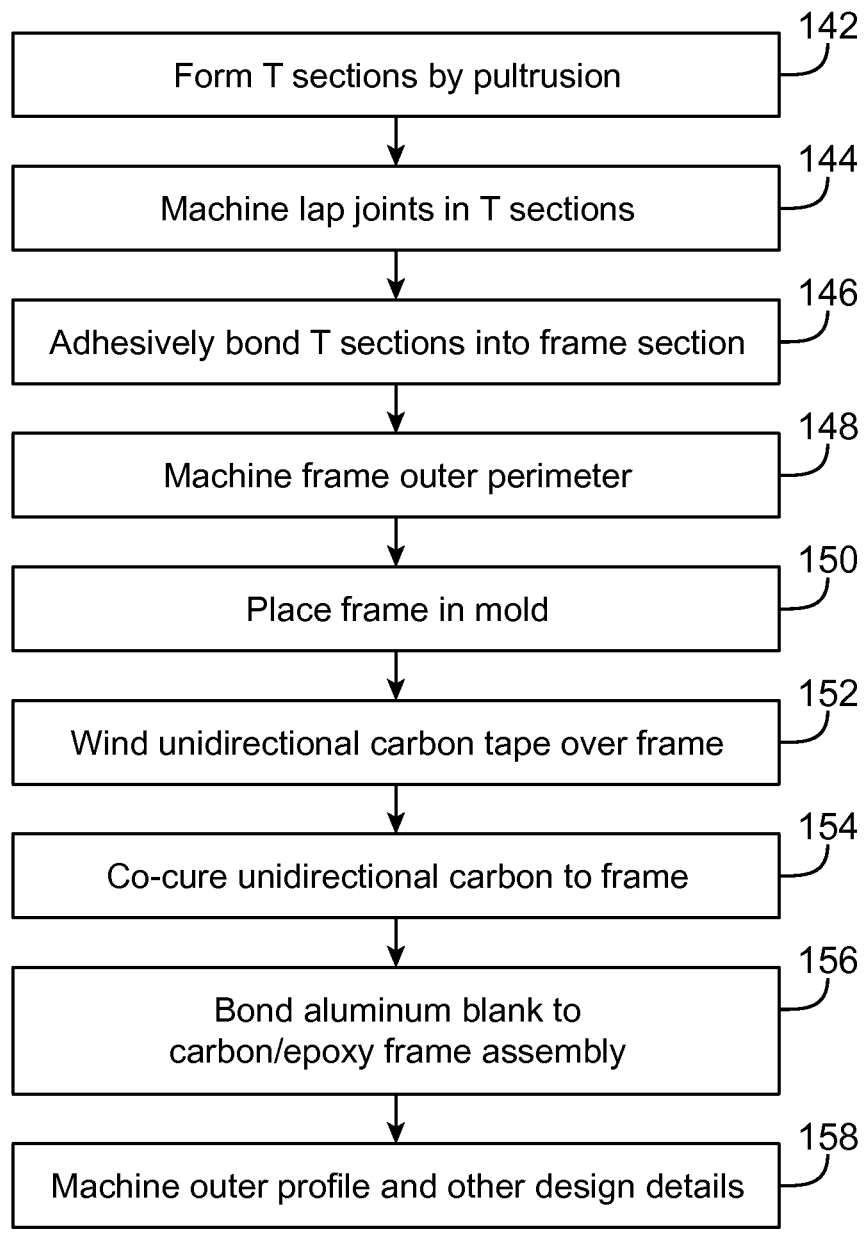
FIG. 23 is a flow chart of illustrative steps that may be used in forming a frame using equipment of the type shown in FIG. 22 in accordance with an embodiment of the present invention.

Illustrative steps involved in forming a frame using the equipment of FIG. 22 are shown in the flow chart of FIG. 23.

At step 142, frame members 26-1 and 26-2 (sometimes referred to as T-sections because they may have a T-shaped cross sections) may be formed using pultrusion tool 120 or using other suitable frame member fabrication equipment.

At step 144, lap joint structures such as notches 106 and 108 may be formed in frame members 26-1 and 26-2 using machining tool 128. Other types of notches, grooves, and mating surfaces may be formed if desired. The use of lap joint notches in joining frame members together is merely illustrative.

At step 146, bonding tool 130 may be used to bond frame members 26-1 to 26-2 (e.g., using adhesive at each lap joint such as adhesive 112 of FIG. 17)

At step 148, machining tool 132 (which may be the same tool as tool 128 or a different tool) may be used to machine eased corners and other features into the bonded frame assembly.

At step 150, the frame assembly formed from members 26-1 and 26-2 may be held in place (e.g., inside a mold in a winding tool) and may be covered with wound layers of tape 60 using the winding tool (e.g., winding tool 134). The wound layers of tape 60 form frame portion 26-3.

The frame assembly with its wound layers of outer tape may be heated (e.g., using the mold in the winding tool or other tool 136) during the operations of step 154. The heating process may cure and/or melt the frame members so that the frame members and the hoop-shaped structure formed from the tape are joined together.

At step 156, bonding tool 138 (which may be the same as bonding tool 130 or which may be a separate bonding tool) may be used to bond aluminum blank 160 (FIG. 25) on frame 26.

During the operations of step 158, machining tool 140 (which may be the same or different than tools 128 and 132) may be used to machine desired features into aluminum blank 160 and/or the fiber-based portions of frame 26, thereby forming a completed frame. The finished frame may be assembled with other portions of device 10 (e.g., internal components 28 and display 18) to form a finished device 10. Screws and other fasteners and adhesive may be used in attaching frame 26 to other portions of device 10.

Figure 24:
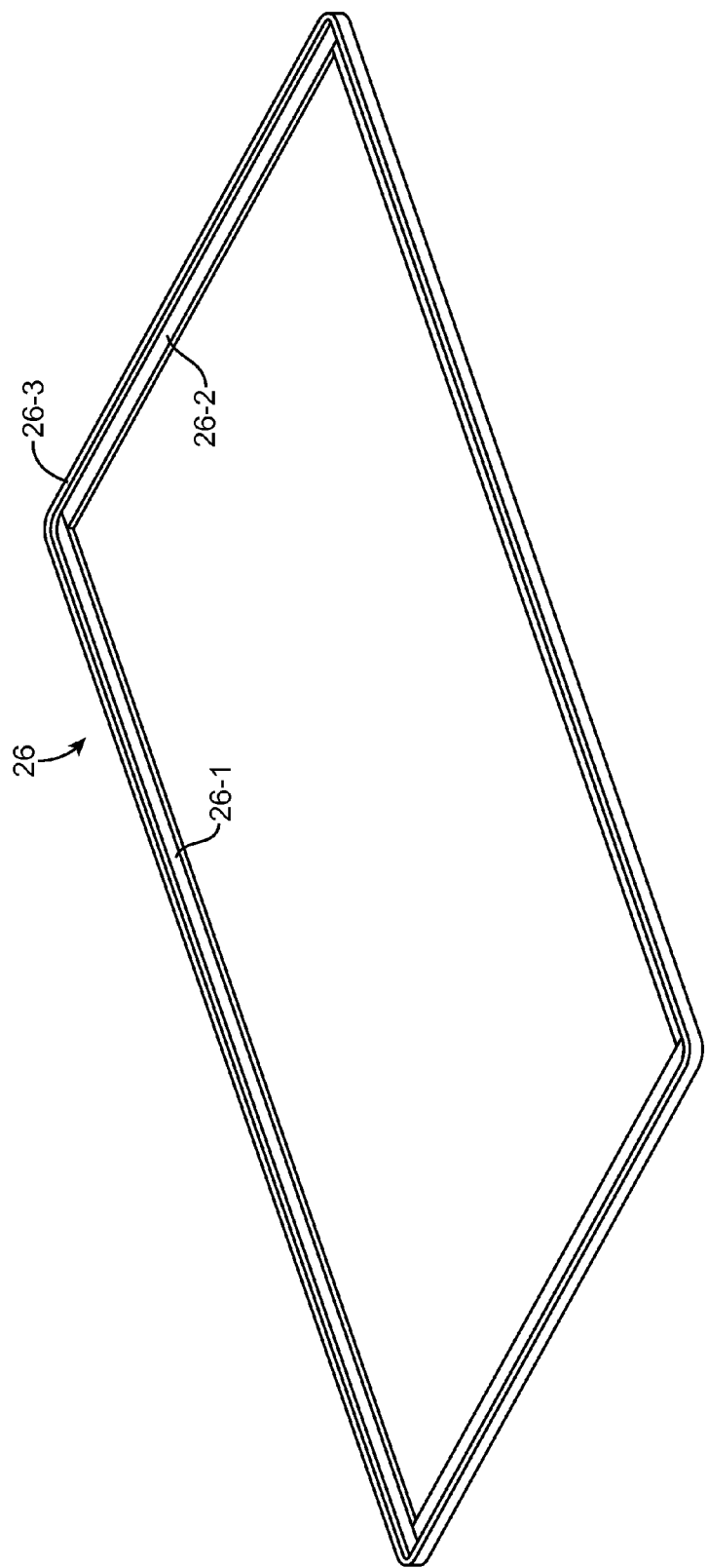
FIG. 24 is a perspective view of an illustrative frame structure formed from T-shaped pultrusion frame members around which layers of fiber tape have been wound in accordance with an embodiment of the present invention.

FIG. 24 is a perspective view of an illustrative frame assembly before attachment of aluminum blank 160.

Figure 25:
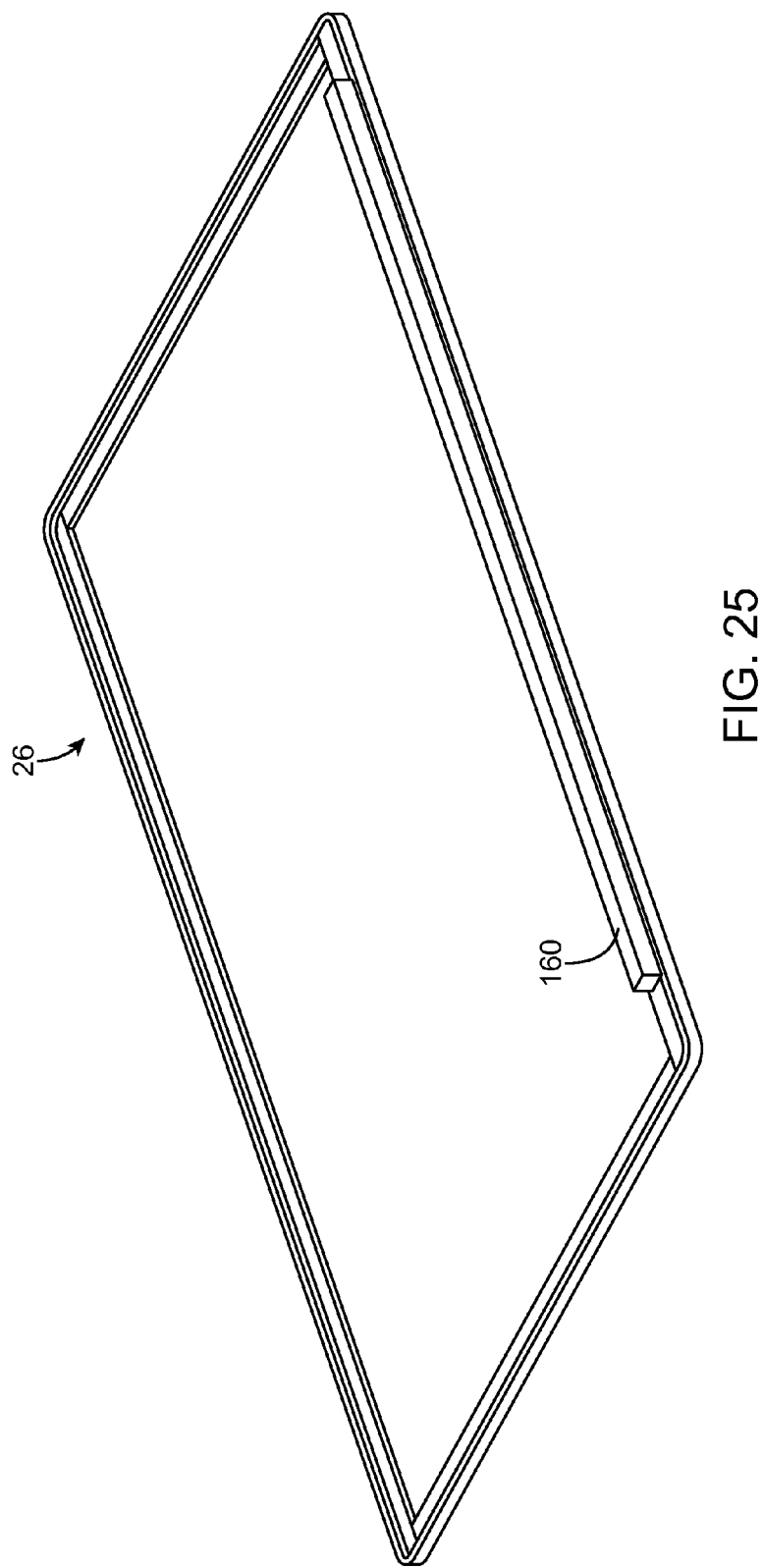
FIG. 25 is a perspective view of an illustrative frame structure of the type shown in FIG. 24 following bonding of a blank of material such as metal in accordance with an embodiment of the present invention.

FIG. 25 is a perspective view of the frame assembly of FIG. 24 following attachment of blank 160.

FIG. 26 shows a finished version of frame 26 following machining of blank 160 and frame members 26-1, 26-2, and 26-3.

If desired, frames may be formed by using adhesives or other attachment mechanisms to attach a complete or substantially complete fiber-composite hoop structure to a pre-assembled frame assembly. A process of this type is shown in the flow chart of FIG. 27.

Figure 27:
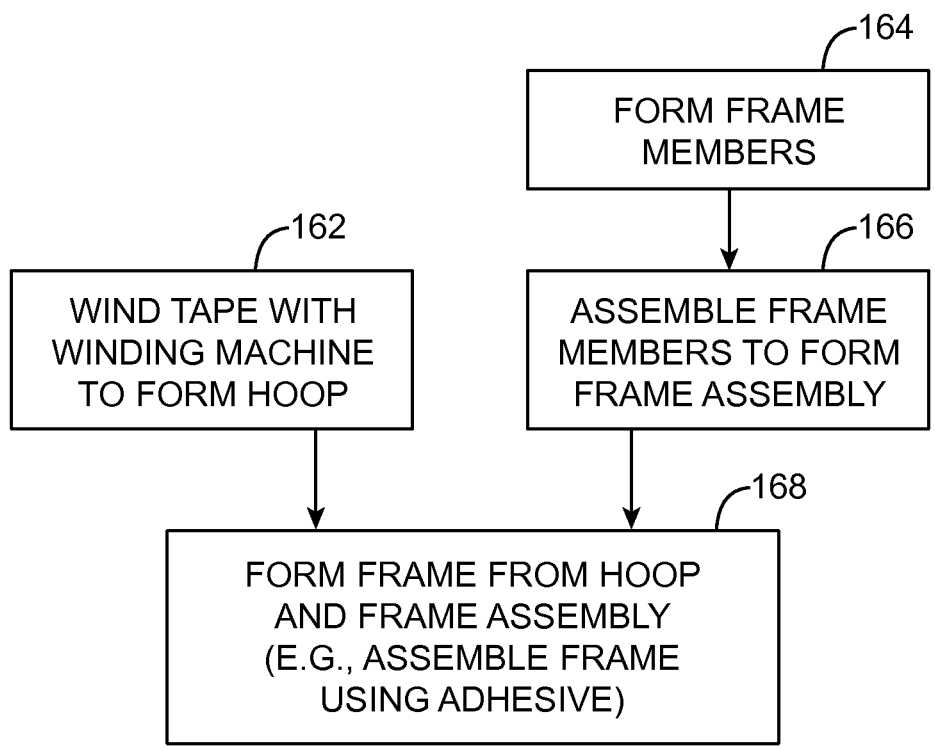
FIG. 27 is a flow chart of illustrative steps involved in forming a frame for an electronic device by attaching a hoop-shaped frame structure such as a wound tape ring to a frame assembly such as a rectangular structure formed from four elongated frame members using adhesive in accordance with an embodiment of the present invention.

During the operations of step 162 of FIG. 27, tape (e.g., tape 60 of FIG. 10) may be wound into a rectangular ring shape or other suitable shape. For example, tape may be wound around a mandrel to form a hoop of fiber-based material (e.g., a rectangular ring). The wound tape may be cured (e.g., when the tape is formed from a thermoset material) or heated and pressed into shape (e.g., when the tape is formed from a thermoplastic material). The hoop-shaped frame structure that is formed from the wound tape may be used in forming an outer rectangular ring (hoop) for frame 26.

Frame members may be formed during the operations of step 164. Frame members may have any suitable cross sectional shape (e.g., rectangular shapes, T-shaped shapes, L-shaped shapes, shapes with non-parallel sidewalls, circular shapes, shapes with both curved and straight sides, etc.). If desired, the lengths of the frame members (i.e., the longitudinal dimensions of the frame members when measured along their longitudinal axes) may be larger (e.g., 3 or more times larger, 10 or more times larger, etc.) than their widths (i.e., the frame members may be formed as elongated members suitable for forming a rectangular frame assembly for supporting a display or other rectangular electronic device component.

Frame members may be formed from fiber-based composites (as an example). Pultrusion techniques and other techniques may be used in forming elongated frame members. For example, frame members 26 may be formed by lamination and compression molding techniques or other suitable techniques. The use of pultrusion techniques to form frame members in connection with frame 26 is merely illustrative.

The frame members that are produced at step 164 may be cured before further processing or may be maintained in an uncured state (e.g., for curing during subsequent frame assembly steps). For example, prepreg frame members with interlocking corners may be formed during the operations of step 164 that are suitable for attaching together. Frame members of this type may be cured together using a curing tool.

A frame assembly may be formed from the elongated frame members during the operations of step 166. For example, four frame members may be assembled into a unitary rectangular ring structure by curing the frame members together in a common mold or by heating and compressing four frame members of a thermoplastic material together using a heated press. Frame members may also be assembled to form a frame assembly using screws or other fasteners, springs, clips, engagement structures of other shapes, notches, grooves, adhesive, other fastening structures, and using combinations of these approaches. Frame members may have notches for forming lap joints or may be joined using other types of joints such as T-joints, butt joints, corners joints, edge joints, etc.

If desired, frame 26 may be formed from four elongated members that are joined together, but that are not surrounded by an outer hoop structure. To enhance strength and resistance to unintended impact events, however, it is generally preferably to mount the frame assembly within an outer hoop structure. As shown in FIG. 27, for example, after forming a hoop-shaped frame structure such as an outer rectangular ring structure during the operations of step 162 and after forming a frame assembly such as an inner rectangular ring frame assembly during the operations of steps 164 and 166, the hoop and frame assembly may be joined (step 168). For example, the rectangular frame assembly of step 166 may be mounted within the hoop of step 162 using adhesive, fasteners, or other suitable attachment mechanisms. Additional structures may be added if desired (e.g., by bonding metal blanks, by machining bonded metal blanks, etc.).

The foregoing is merely illustrative of the principles of this invention and various modifications can be made by those skilled in the art without departing from the scope and spirit of the invention.

What is claimed is:

1. A method for forming an electronic device frame, comprising:
    forming frame members;
    assembling the frame members to form a rectangular frame assembly for an electronic device; and
    with a winding tool, winding fiber tape around the rectangular frame assembly,
    wherein the fiber tape is formed from a continuous piece of binder preimpregnated tape wrapped around the winding tool.

2. The method defined in claim 1 wherein forming the frame members comprises forming elongated frame members with a pultrusion tool.

3. The method defined in claim 1 wherein forming the frame members comprises forming carbon fiber frame members.

4. The method defined in claim 3 wherein assembling the frame members comprises attaching the frame members to each other using lap joints and adhesive.

5. The method defined in claim 4 further comprising forming notches at ends of the frame members.

6. The method defined in claim 5 further comprising heating the frame members of the rectangular frame assembly and the wound fiber tape to form a unitary fiber composite frame structure.

7. The method defined in claim 6 further comprising attaching a metal blank to the unitary fiber composite frame structure.

8. The method defined in claim 7 further comprising machining the metal blank.

9. The method defined in claim 8 further comprising machining the unitary fiber composite frame structure.

10. The method defined in claim 1, further comprising attaching a metal blank to at least one of the frame members forming the rectangular frame assembly.

11. The method defined in claim 10, wherein the attaching of the metal blank comprises bonding an aluminum blank to the at least one of the frame members forming the rectangular frame assembly using adhesive.

12. the method defined in claim 1, wherein the frame members forming the rectangular frame assembly each include a longitudinal axis.

13. The method defined in claim 12, wherein the winding of the fiber tape around the rectangular frame assembly comprises:
    coupling the fiber tape to one of, a distinct frame member forming the rectangular frame assembly, or fiber tape wound around the distinct frame member forming the rectangular frame assembly,
    wherein the fiber tape is in parallel alignment with the longitudinal axis of the distinct frame member forming the rectangular frame assembly.

14. The method defined in claim 1, further comprising curing at least one of the fiber tape, and the frame members forming the rectangular frame assembly.

15. The method defined in claim 1, wherein the substantially rectangular frame assembly for the electronic device includes substantially rounded corners.

16. A method for forming an electronic device frame, comprising:
    forming carbon fiber frame members;
    forming notches at ends of the carbon fiber frame members;
    assembling the carbon fiber frame members to each other using lap joints and adhesive to form a frame assembly; and
    with a winding tool, winding fiber tape around the frame assembly.

17. The method defined in claim 16 further comprising heating the frame members of the frame assembly and the wound fiber tape to form a unitary fiber composite frame structure.

18. The method defined in claim 17 further comprising attaching a metal blank to the unitary fiber composite frame structure.

19. The method defined in claim 18 further comprising machining the metal blank.

20. The method defined in claim 17 further comprising machining the unitary fiber composite frame structure.

* * * * *